US005321207A

United States Patent [19]

Huang

[11] Patent Number: 5,321,207

[45] Date of Patent: Jun. 14, 1994

[54] COAXIAL CONDUCTOR

[76] Inventor: George Y. Huang, 5th Fl., No.277-1, Sec.4, Pa-Te Rd., Taipei City, Taiwan

[21] Appl. No.: 989,830

[22] Filed: Dec. 14, 1992

[51] Int. Cl.[5] ....................... H01R 17/04; H02G 15/02

[52] U.S. Cl. .................................. 174/75 C; 439/585; 439/877

[58] Field of Search .............. 174/75 C; 439/578, 585, 439/877

[56] References Cited

U.S. PATENT DOCUMENTS

| | | | |
|---|---|---|---|
| 3,297,979 | 1/1967 | O'Keefe et al. | 439/585 |
| 3,499,101 | 3/1970 | Forney, Jr. et al. | 174/75 C |
| 4,165,911 | 8/1979 | Laudig | 174/75 C |
| 5,131,862 | 7/1992 | Gershfeld | 174/75 C |
| 5,183,411 | 2/1993 | Yu | 439/578 |

*Primary Examiner*—Morris H. Nimmo

*Attorney, Agent, or Firm*—Marshall & Melhorn

[57] ABSTRACT

A coaxial conductor includes a BNC coax connector, a coaxial cable and a sleeve. The coaxial cable has a center conductor, a braided outer conductor, a dielectric which separates the center conductor from the braided outer conductor and an insulating jacket which is provided around the braided outer conductor. One end of the insulating jacket is stripped so as to expose a portion of the braided outer conductor. The exposed portion of the braided outer conductor is pulled over the insulating jacket so as to expose a portion of the dielectric. The exposed portion of the dielectric is stripped so as to expose a portion of the center conductor which is extended into a tubular inner conductive portion of the coax connector so as to connect electrically therewith. The sleeve has a front end with a wide tubular part which engages a tubular outer conductive portion of the coax connector and a rear end with a narrow tubular part. The narrow tubular part of the sleeve is crimped to the coaxial cable such that the cross-section of the narrow tubular part deviates from a larger circle to a substantially smaller circle with a pair of diametrically opposite flattened radial outward portions so as to cause the narrow tubular part to contact tightly a large part of the exposed portion of the braided outer conductor.

3 Claims, 2 Drawing Sheets

COAXIAL CONDUCTOR

BACKGROUND OF THE INVENTION

1. Field of the Invention

The invention relates to a coaxial conductor, more particularly to a coaxial conductor which includes a coaxial cable and a BNC coax connector.

2. Description of the Related Art

Referring to FIG. 1, a conventional coaxial conductor is shown to comprise a BNC coax connector (10), a coaxial cable (20) and a sleeve (30). The coax connector (10) includes a stationary seat (11), a tubular inner conductive portion (12) and a tubular outer conductive portion (13) which is insulated electrically from the inner conductive portion (12). Referring to FIG. 2, the coaxial cable (20) includes a center conductor (21), a braided outer conductor (22), a dielectric (23) which separates the center conductor (21) from the braided outer conductor (22) and an insulating jacket (24) which is provided around the braided outer conductor (22). The sleeve (30) covers the electrical connection between the coax connector (10) and the coaxial cable (20) and has a wide tubular part (31) at a front end and a narrow tubular part (32) at a rear end.

FIGS. 3, 4 and 5 illustrate the assembly of the conventional coaxial conductor shown in FIG. 1. One end of the insulating jacket (24) is stripped so as to expose a portion of the braided outer conductor (22). The exposed portion of the braided outer conductor (22) is then pulled over the insulating jacket (24) so as to expose a portion of the dielectric (23). One end of the dielectric (23) is stripped so as to expose a portion of the center conductor (21). During assembly, the stripped end of the coaxial cable (20) is extended through the sleeve (30) via the narrow tubular part (32), as shown in FIG. 3. The center conductor (21) is then extended into the inner conductive portion (12) of the coax connector (10) and is welded or riveted thereto. The wide tubular part (31) of the sleeve (30) is in tight frictional engagement with the outer conductive portion (13) of the coax connector (10). A crimping tool (not shown) is then used so as to crimp the narrow tubular part (32) of the sleeve (30) to the coaxial cable (20). The drawbacks of the conventional coaxial conductor shown in FIG. 1 are as follows:

1. Referring to FIG. 5, the cross-section at the crimped portion of the narrow tubular part (32) of the sleeve (30) deviates from a circle to an oval when the narrow tubular part (32) is crimped to the coaxial cable (20). Thus, only two opposite portions of the exposed portion of the braided outer conductor (22), which was pulled over the insulating jacket (24), are in tight contact with the sleeve (30). This results in an unstable engagement between the sleeve (30) and the coaxial cable (20).

2. Deformation of the dielectric (23) similarly occurs because the crimping force is applied on only two opposite portions thereof. This can affect the insulating characteristics of the dielectric (23), thereby affecting correspondingly the signal transmission characteristics of the coaxial cable (20).

3. The sleeve (30) contacts only two opposite portions of the exposed portion of the braided outer conductor (22), thereby resulting in a relatively small electrical contact area.

Referring to FIG. 6, it is also known in the art to crimp the sleeve (30) to the coaxial cable (20) in such a manner that the cross-section of the former is changed to a hexagonal structure. Such a structure, however, cannot sufficiently overcome the above mentioned drawbacks.

SUMMARY OF THE INVENTION

Therefore, the objective of the present invention is to provide an improved coaxial conductor which can sufficiently overcome the above mentioned drawbacks that are commonly associated with the prior art.

Accordingly, the preferred embodiment of a coaxial conductor of the present invention comprises:

a BNC coax connector having a tubular inner conductive portion and a tubular outer conductive portion which is insulated electrically from the inner conductive portion;

a coaxial cable having a center conductor, a braided outer conductor, a dielectric which separates the center conductor from the braided outer conductor and an insulating jacket which is provided around the braided outer conductor, one end of the insulating jacket being stripped so as to expose a portion of the braided outer conductor, said exposed portion of the braided outer conductor being pulled over the insulating jacket so as to expose a portion of the dielectric, said exposed portion of the dielectric being stripped so as to expose a portion of the center conductor which is extended into the inner conductive portion so as to connect electrically therewith; and a sleeve having a front end with a wide tubular part which engages the outer conductive portion and a rear end with a narrow tubular part, said coaxial cable extending through the sleeve, said narrow tubular part of the sleeve being crimped to the coaxial cable such that the cross-section of the narrow tubular part deviates from a larger circle to a substantially smaller circle with a pair of diametrically opposite flattened radial outward portions so as to cause the narrow tubular part to contact tightly a large part of the exposed portion of the braided outer conductor.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
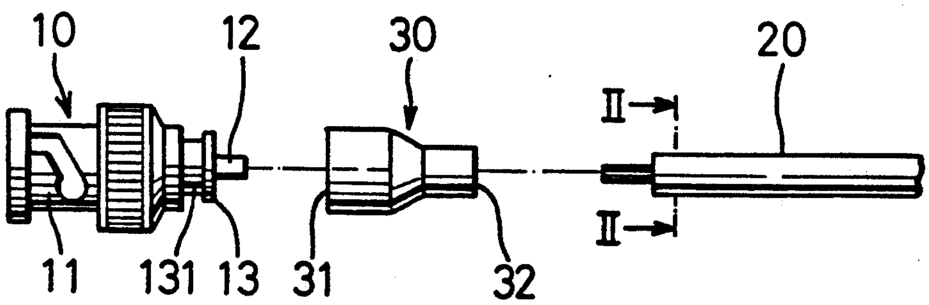
FIG. 1 (PRIOR ART)
FIG. 1 is an exploded view of a conventional coaxial conductor.
Figure 2:
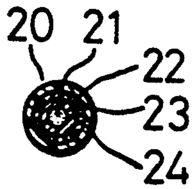
FIG. 2 (PRIOR ART)
FIG. 2 is a sectional view of a coaxial cable of the conventional coaxial conductor taken along line II—II in FIG. 1.
Figure 5:
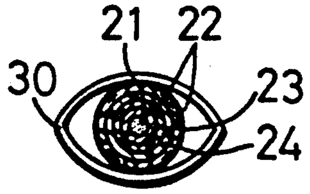
FIG. 5 (PRIOR ART)
FIG. 5 is a sectional view of the conventional coaxial conductor taken along line V—V in FIG. 4.
Figure 3:
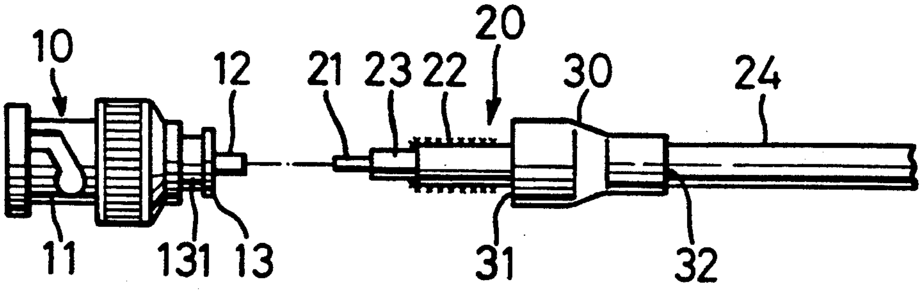
FIG. 3 (PRIOR ART)
FIG. 3 is a partially assembled schematic view of the conventional coaxial conductor.
Figure 4:
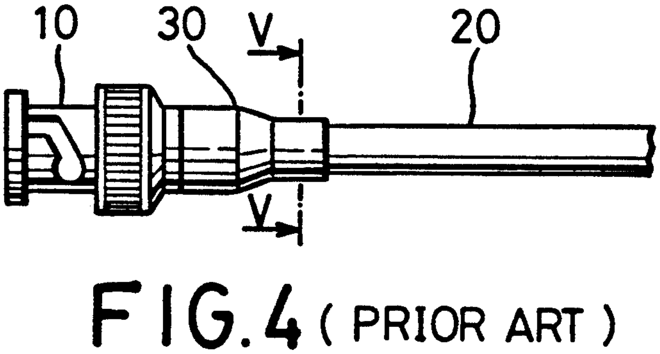
FIG. 4 (PRIOR ART)
FIG. 4 is a schematic view of the conventional coaxial conductor when assembled.
Figure 6:
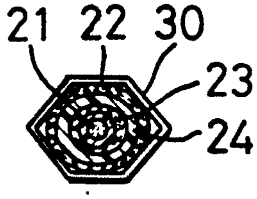
FIG.6 (PRIOR ART)
FIG. 6 is a sectional view of a crimped portion of another conventional coaxial conductor.

Prior to the detailed description of the preferred embodiment, it should be noted that like elements are indicated by the same reference numerals throughout the disclosure.

Referring to FIGS. 7 to 10, the preferred embodiment of a coaxial conductor according to the present invention is shown to be substantially similar to the conventional coaxial conductor shown in FIGS. 1 to 5. The main difference between the coaxial conductor of the present invention and that of the prior art resides in the structural connection between the components of the former.

Figure 7:
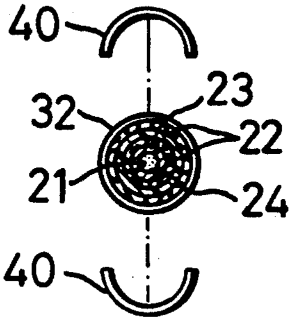
FIG. 7 illustrates how a crimped portion of the preferred embodiment of a coaxial conductor according to the present invention is formed.
Figure 8:
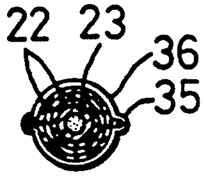
FIG. 8 is a sectional view of a first crimped portion of the preferred embodiment.

Referring to FIG. 7, a crimping tool with two semi-circular jaws (40) is used to crimp the narrow tubular part (32) of the sleeve (30) to the coaxial cable (20). Referring to FIG. 8, which is a sectional view of the preferred embodiment taken along line VIII—VIII in FIG. 10, the cross-section at the crimped portion (36) of the narrow tubular part (32) of the sleeve (30) deviates from a larger circle to a substantially smaller circle with a pair of diametrically opposite flattened radial outward portions (35) when the narrow tubular part (32) is crimped to the coaxial cable (20). Thus, a large part of the exposed portion of the braided outer conductor (22), which was pulled over the insulating jacket (24), is in tight contact with the sleeve (30). This results in better engagement between the sleeve (30) and the coaxial cable (20) and in a larger electrical contact area between the sleeve (30) and the exposed portion of the braided outer conductor (22). Furthermore, the substantially circular cross-section at the crimped portion (36) of the sleeve (30) prevents the deformation of the dielectric (23), thereby minimizing the adverse effects of the crimping operation to the insulating characteristics of the dielectric (23) and to the signal transmission characteristics of the coaxial cable (20).

Figure 9:
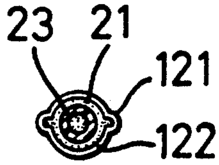
FIG. 9 is a sectional view of a second crimped portion of the preferred embodiment.

Referring to FIGS. 1 and 9, the center conductor (21) of the coaxial cable (20) is a stranded conductor. The exposed portion of the center conductor (21) is pulled over the dielectric (23) and is inserted into the inner conductive portion (12) of the coax connector (10). A crimping tool, which is similar to that which was used to crimp the narrow tubular part (32) of the sleeve (30) to the coaxial cable (20), is used to crimp the inner conductive portion (12) to the center conductor (21) of the coaxial cable (20). Therefore, the cross-section at the crimped portion (122) of the inner conductive portion (12) similarly deviates from a larger circle to a substantially smaller circle with a pair of diametrically opposite flattened radial outward portions (121) when the inner conductive portion (12) is crimped to the coaxial cable (20), thus ensuring tight engagement and contact between the inner conductive portion (12) and the center conductor (21).

Figure 10:
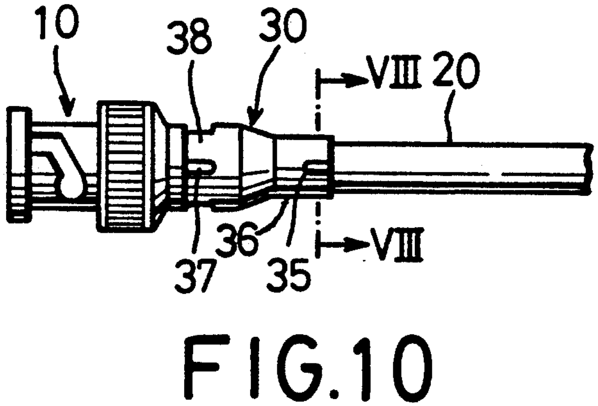
FIG. 10 is a schematic view of the preferred embodiment of a coaxial conductor according to the present invention.

Referring to FIGS. 1 and 10, the outer conductive portion (13) of the coax connector (10) has an outer surface which is formed with an annular indentation (131). The wide tubular part (31) of the sleeve (30) is sleeved onto the outer conductive portion (13). A crimping tool, which is similar to that which was used to crimp the narrow tubular part (32) of the sleeve (30) to the coaxial cable (20), is used to crimp the wide tubular part (31) to the outer conductive portion (13) of the coax connector (10) at the annular indentation (131) of the latter. Therefore, the cross-section at the crimped portion (38) of the sleeve (30) similarly deviates from a larger circle to a substantially smaller circle with a pair of diametrically opposite flattened radial outward portions (37) when the wide tubular part (31) is crimped to the outer conductive portion (13). This prevents the untimely detachment of the sleeve (30) from the coax connector (10).

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A coaxial conductor including a BNC coax connector having a tubular inner conductive portion and a tubular outer conductive portion which is insulated electrically from said inner conductive portion;

a coaxial cable having a center conductor, a braided outer conductor, a dielectric which separates said center conductor from said braided outer conductor and an insulating jacket which is provided around said braided outer conductor, one end of said insulating jacket being stripped so as to expose a portion of said braided outer conductor, said exposed portion of said braided outer conductor being pulled over said insulating jacket so as to expose a portion of said dielectric, said exposed portion of said dielectric being stripped so as to expose a portion of said center conductor which is extended into said inner conductive portion so as to connect electrically therewith; and a sleeve having a front end with a wide tubular part which engages said outer conductive portion and a rear end with a narrow tubular part, said coaxial cable extending through and being in tight contact with said sleeve;

wherein the improvement comprises:

said narrow tubular part of said sleeve being crimped to said coaxial cable such that the cross-section of said narrow tubular part deviates from a larger circle to a substantially smaller circle with a pair of diametrically opposite flattened radial outward portions so as to cause said narrow tubular part to contact tightly a large part of said exposed portion of said braided outer conductor.

2. The coaxial cable as claimed in claim 1, wherein said inner conductive portion of said coax connector is crimped to said center conductor of said coaxial cable such that the cross-section of said inner conductive portion deviates from a larger circle to a substantially smaller circle with a pair of diametrically opposite flattened radial outward portions so as to cause said inner conductive portion to contact tightly said center conductor.

3. The coaxial conductor as claimed in claim 1, wherein said outer conductive portion of said coax connector has an outer surface which is formed with an annular indentation, said wide tubular part being sleeved onto said outer conductive portion and being crimped thereto at said annular indentation such that the cross-section of said outer conductive portion deviates from a larger circle to a substantially smaller circle with a pair of diametrically opposite flattened radial outward portions so as to prevent untimely detachment of said sleeve from said coax connector.

* * * * *